United States Patent
Schlaff et al.

(10) Patent No.: US 10,428,704 B2
(45) Date of Patent: Oct. 1, 2019

(54) OIL FILTER ANTI-ROTATION LOCK FOR AN ENGINE

(71) Applicant: Ford Global Technologies, LLC, Dearborn, MI (US)

(72) Inventors: Roger Schlaff, Dearborn Hts., MI (US); Richard J. Anton, Northville, MI (US); Gary Michael Fenn, Plymouth, MI (US); Michael Selleck, St. Clair Shores, MI (US); James M. Basile, Dundee, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/497,371

(22) Filed: Apr. 26, 2017

(65) Prior Publication Data
US 2018/0313241 A1    Nov. 1, 2018

(51) Int. Cl.
*F01M 11/03* (2006.01)
*B01D 35/30* (2006.01)
*B01D 27/08* (2006.01)

(52) U.S. Cl.
CPC ............. *F01M 11/03* (2013.01); *B01D 27/08* (2013.01); *B01D 35/30* (2013.01); *B01D 2201/4076* (2013.01); *F01M 2011/031* (2013.01)

(58) Field of Classification Search
CPC .. F01M 11/03; F01M 2011/031; B01D 35/30; B01D 2201/4076; B01D 35/005; B01D 35/02; B01D 35/306; B01D 2201/24; B01D 2201/4023; B01D 27/08
See application file for complete search history.

(56) References Cited

U.S. PATENT DOCUMENTS

| 1,730,475 | A | * | 10/1929 | Pelletier | ............... | B01D 35/005 |
| | | | | | | 210/435 |
| 2,815,237 | A | * | 12/1957 | Jones | ..................... | B01D 27/00 |
| | | | | | | 292/256.71 |
| 3,485,380 | A | * | 12/1969 | McLaren | ............... | B01D 27/08 |
| | | | | | | 210/444 |
| 5,259,953 | A | | 11/1993 | Baracchi et al. | | |
| 6,679,990 | B2 | | 1/2004 | Reinhart | | |

(Continued)

FOREIGN PATENT DOCUMENTS

GB           732848          6/1955

*Primary Examiner* — David C Mellon
(74) *Attorney, Agent, or Firm* — LeClairRyan

(57) ABSTRACT

An anti-rotation oil filter system to prevent inadvertent release of the oil filter from a lubrication system is provided. The system includes a ratchet gear attached to one of either the oil filter or the engine's oil filter attachment base. In both embodiments, a spring-loaded ratchet release pawl is provided to engage the ratchet and to thereby hold the filter in place against the attachment base until such time as the filter needs to be changed. Where the ratchet gear is fitted to the filter, a ratchet release pawl is associated with the engine's oil filter attachment base. The teeth of the ratchet ring gear extend outwardly from the filter. Alternatively, where the ratchet gear is fitted to the engine's filter attachment base, a ratchet release pawl is associated with the filter. Regardless of the embodiment, the ratchet gear and pawl arrangement restricts filter rotation to maintain clamp load.

18 Claims, 5 Drawing Sheets

(56) References Cited

U.S. PATENT DOCUMENTS

2004/0129626 A1* 7/2004 Fischer .............. B01D 35/0273
  210/416.4
2007/0187316 A1* 8/2007 Weinberger ............ B01D 27/08
  210/232
2012/0261323 A1* 10/2012 Badeau .................. B01D 27/08
  210/232

* cited by examiner

OIL FILTER ANTI-ROTATION LOCK FOR AN ENGINE

TECHNICAL FIELD

The disclosed inventive concept relates generally to oil filtration of lubrication systems for internal combustion engines and for any machine that requires a canister or cartridge oil filter as well as for any machine using a liquid other that a lubricating oil, such as a coolant. More particularly, the disclosed inventive concept relates to oil filters for such machines having an arrangement to prevent unintended loosening of the oil filter from the engine.

BACKGROUND OF THE INVENTION

Virtually every engine today utilizes and oil lubrication system to reduce or eliminate friction between internal moving components. These oil lubrication systems typically incorporate an oil filter that continuously filters the circulating engine oil. The filtration process extends the useful life of the lubricating oil.

The typical oil filter is of the spin on cartridge variety that includes internal filter media and an internally-threaded aperture for attachment to an externally-threaded oil outlet that protrudes from a low point on the engine block. The circulating oil exits the oil outlet, enters an interior circumferential chamber of the oil filter, passes through the internal filter media into an outer axial chamber, exits the oil filter through one of several oil passageways formed concentrically around the internally-threaded aperture, and back into the engine lubrication system via one of several oil inlets formed concentrically around the externally-threaded oil outlet. The installed oil filter thus functions like a sieve by capturing and retaining oil pollutants such as metal particles.

The oil filter is required to be changed along with the engine oil after a certain number of engine operating hours (or vehicle miles). Once the used engine oil is drained from the engine by a technician, the used oil filter is spun off of the externally-threaded oil outlet and a new filter is spun on and is tightened preferably to the point of being "finger tight," but no more, thereby allowing for removal at the end of the next oil cycle without the need for a filter wrench. Occasionally, however, the technician fails to tighten the filter properly or, even if tightened properly, the sealing ring of the filter may not be properly seated against the oil filter base on the engine. Because the engine (or other machine to which the filter is attached) generates a significant amount of vibration, the filter, even a properly seated filter, may become inadvertently loosened resulting in rapid loss of the lubricating oil and, in many cases, catastrophic engine failure.

As in so many areas of vehicle technology there is always room for improvements related to the design of an engine lubricating system for use in an conjunction with internal combustion engine. Particularly, it would be advantageous to provide an oil filter for such a system that has an anti-rotation system to prevent the inadvertent loosening of an oil filter once in place.

SUMMARY OF THE INVENTION

The disclosed inventive concept overcomes the problems of known oil filters by providing an anti-rotation oil filter system that prevents inadvertent release of the oil filter from the lubrication system. The system includes a ratchet gear attached to one of either the oil filter or the oil filter attachment base formed on the engine. In both embodiments, a spring-loaded ratchet release pawl is provided to engage the ratchet and to thereby hold the oil filter in place against the oil filter attachment base until such time as the oil filter needs to be changed.

According to the embodiment of the disclosed inventive concept in which the ratchet gear is fitted to the oil filter, a ratchet release pawl is associated with the engine's oil filter attachment base. The ratchet gear is preferably a ring gear fitted to the lower end of the oil filter. Alternatively, the ratchet gear may be integrally formed with the canister body of the oil filter as a single, deep-drawn stamping. Regardless of its construction, the teeth of the ratchet ring gear extend outwardly from the canister body. The oil filter further includes a base plate attached at its lower end. The base plate has an internally-threaded aperture which is threaded onto the externally-threaded oil outlet. The base plate further has a plane that is coplanar with the plane of the ratchet ring gear.

According to the embodiment of the disclosed inventive concept in which the ratchet gear is fitted to the oil filter attachment base formed on the engine, a ratchet release pawl is associated with the oil filter. The ratchet release pawl may be fixed permanently to lower end of the oil filter for engagement with the ratchet gear or may be attached to a strap that may be fixed to a conventional oil filter by the repair technician.

Regardless of the embodiment, the ratchet gear and pawl arrangement restricts the rotation of the filter to help maintain clamp load. The pawl engages the ratchet gear by spring force as the filter is installed, allowing rotation in one direction only. A release tab on the end of the release pawl is depressed to overcome the spring force on the pawl allowing the release pawl to disengage from the ratchet gear, thereby permitting the filter to rotate for removal.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
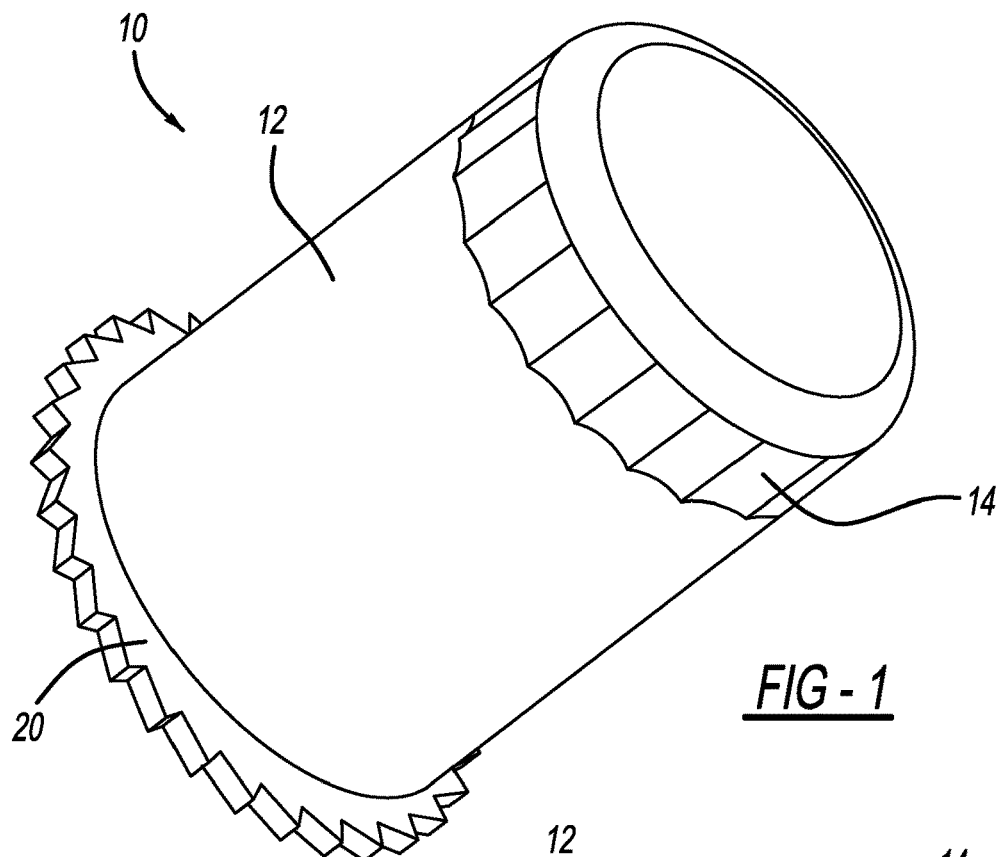
FIG. 1 is a first perspective view of an embodiment of an oil filter according to the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 6:
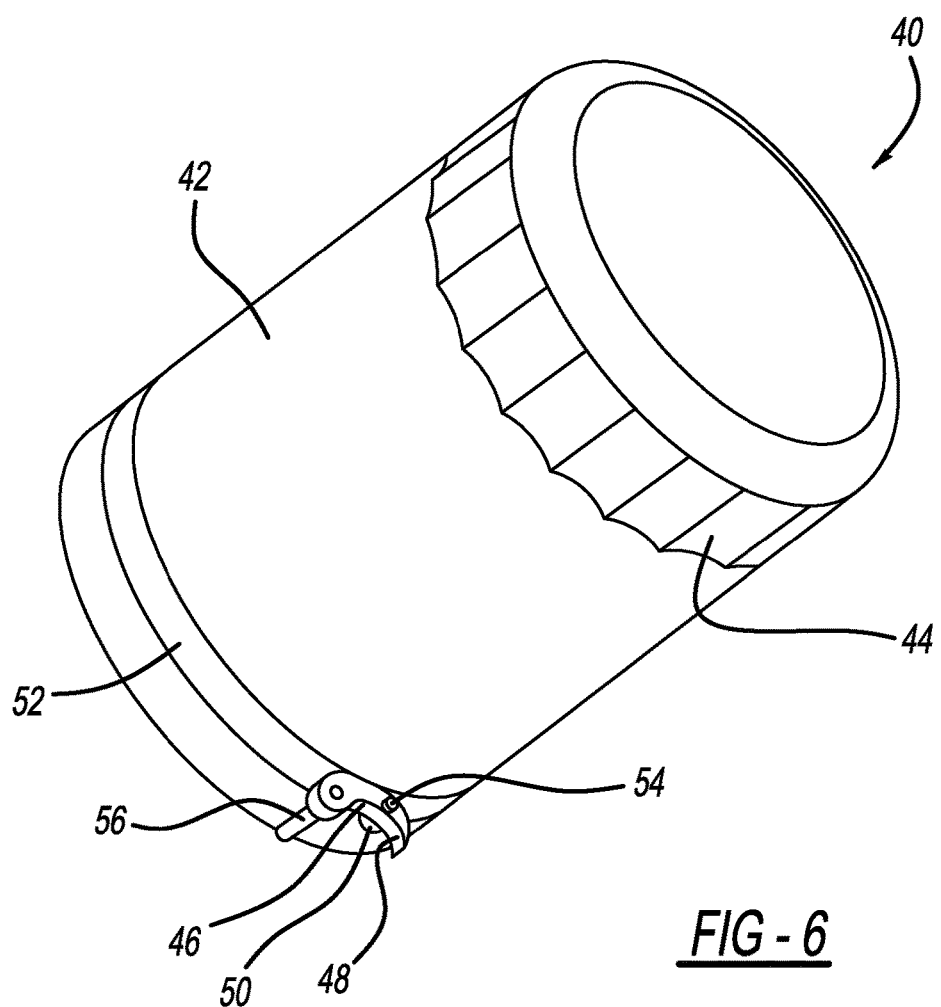
FIG. 6 illustrates a perspective view of another embodiment of the oil filter according to the disclosed inventive concept.
Figure 7:
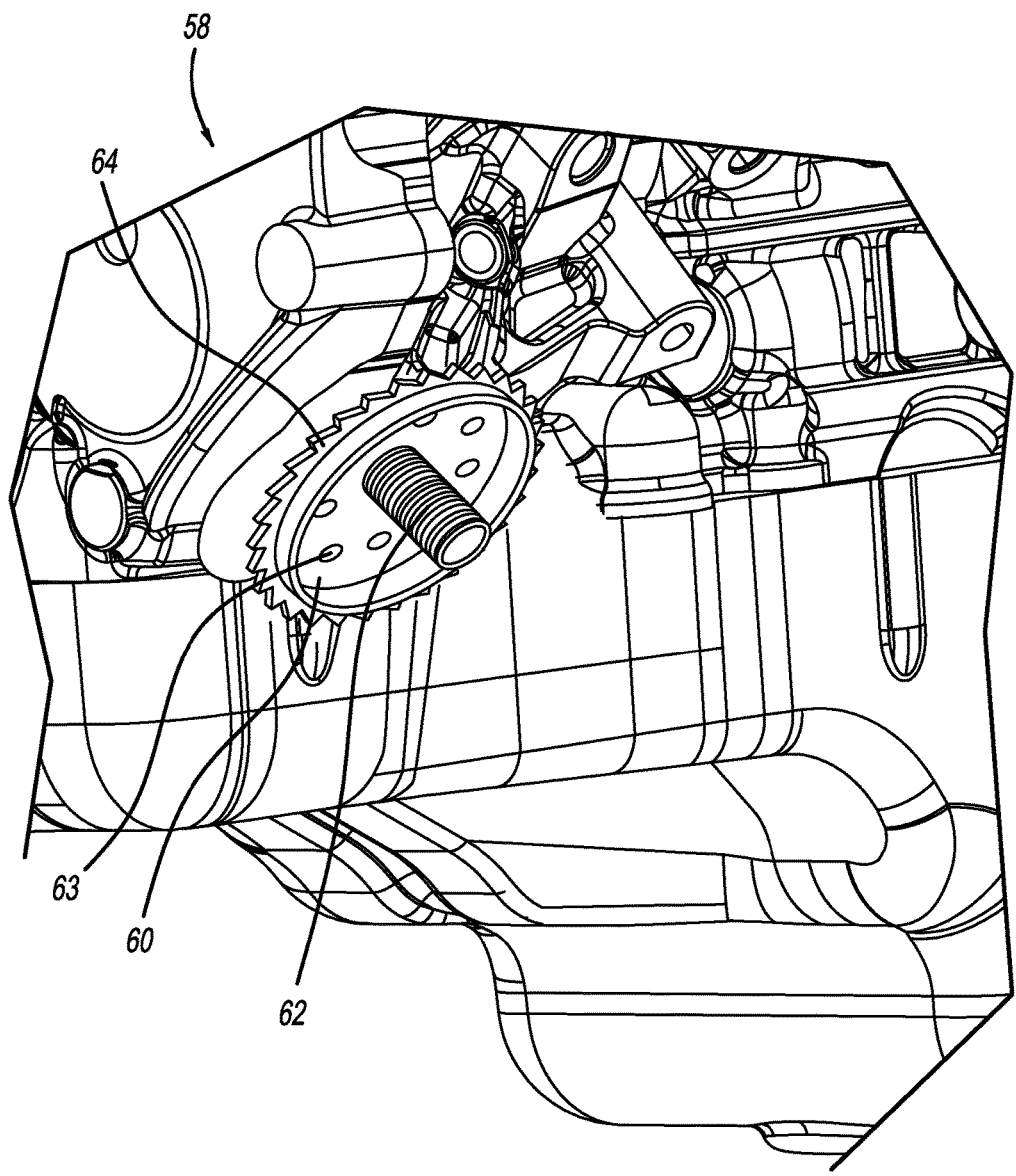
FIG. 7 illustrates an environmental view of the oil filter receptacle for the oil filter shown in FIG. 6.

In general, variations of an oil filter anti-rotation lock system according to the disclosed inventive concept are illustrated in the figures. One embodiment of the oil filter anti-rotation lock system is illustrated in FIGS. 1 through 5 while another embodiment of the oil filter anti-rotation lock system is illustrated in FIGS. 6 and 7. It is to be understood that the precise configurations shown in the figures are not intended as being limiting, as variations such as shape, position and size can be anticipated without deviating from either the spirit or the scope of the disclosed inventive concept.

Figure 2:
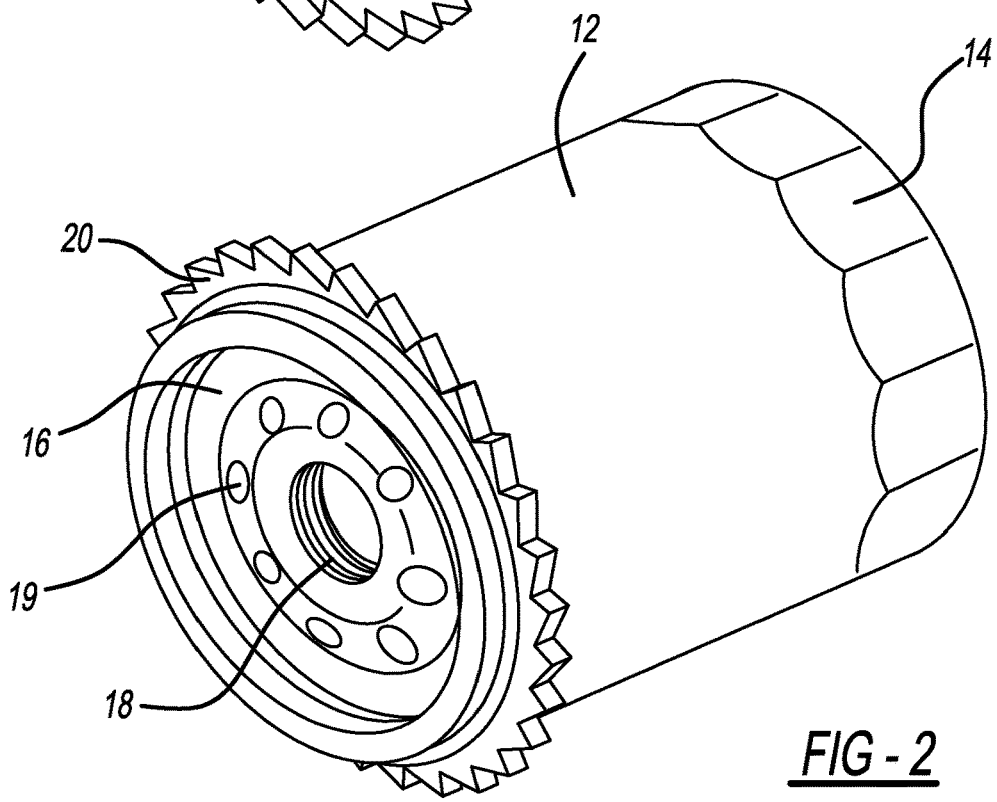
FIG. 2 is a second perspective view of the embodiment of the oil filter as illustrated in FIG. 1.

Referring to FIGS. 1 and 2, two views of an oil filter according to one embodiment of the disclosed inventive concept are illustrated. The oil filter, generally illustrated as 10, includes an elongated canister body 12 having a grip area 14 at its one end as is known in the art. The grip area 14 provides a convenient and practical location by which the oil filter remover/installer may grasp the filter for rotation.

The oil filter 10 includes a canister base 16 formed at the end opposite the end having the grip area 14. The canister base 16 includes a centrally formed internally-threaded port 18 for attachment by threading to the lubrication system of the engine as discussed below. The internally-threaded port 18 provides a passageway for incoming lubricating oil. As is known in the art, the flowing lubricating oil is passed from an interior circumferential chamber through a filtering media provided within the oil filter 10, into a an outer axial chamber, and out of the oil filter 10 through a series of outlets 19 formed concentrically around the internally-threaded port 18.

A ratchet ring gear 20 may be attached adjacent the canister base 16 by mechanical fasteners, welding or a suitable adhesive. Alternatively, the ratchet ring gear 20 may be formed with the canister body 12 as a single, deep-drawn stamping.

Figure 3:
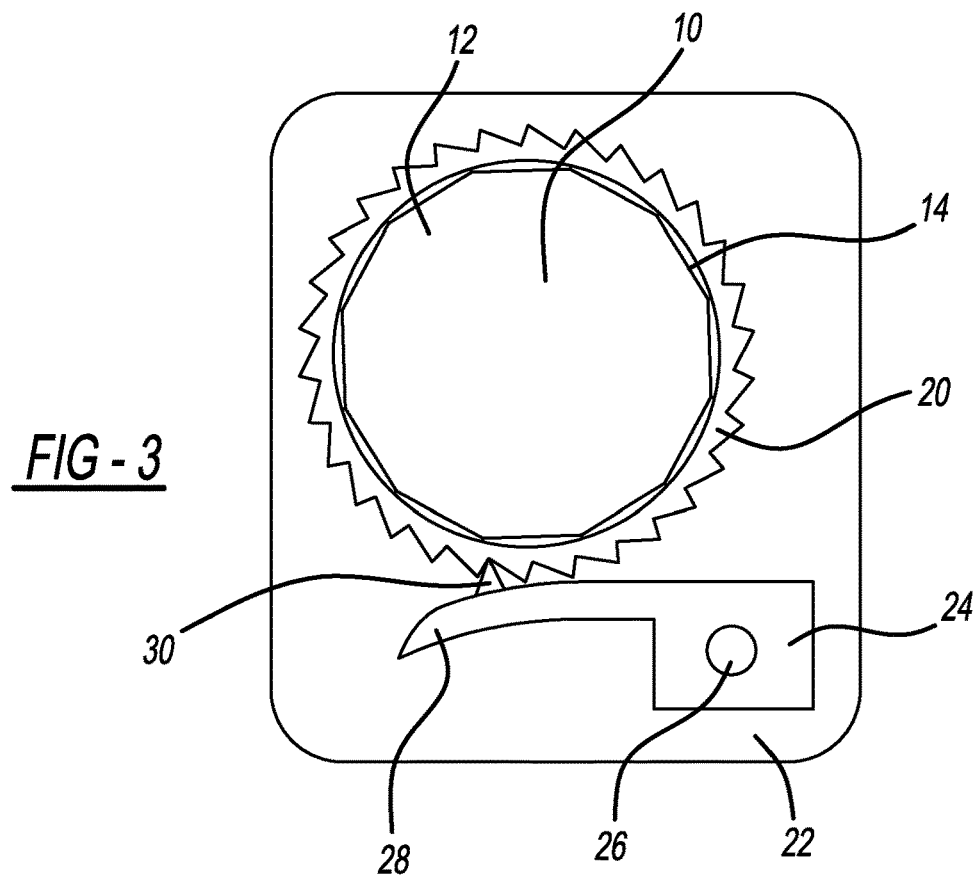
FIG. 3 is a front view of an arrangement that includes the embodiment of the oil filter of FIG. 1 shown in place on an engine.
Figure 4:
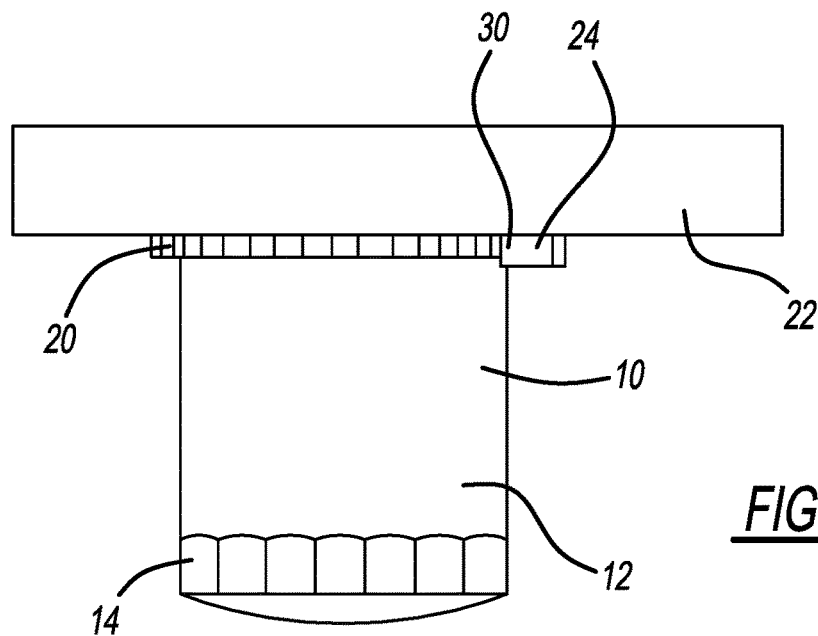
FIG. 4 illustrates a side view of the arrangement shown in FIG. 3.
Figure 5:
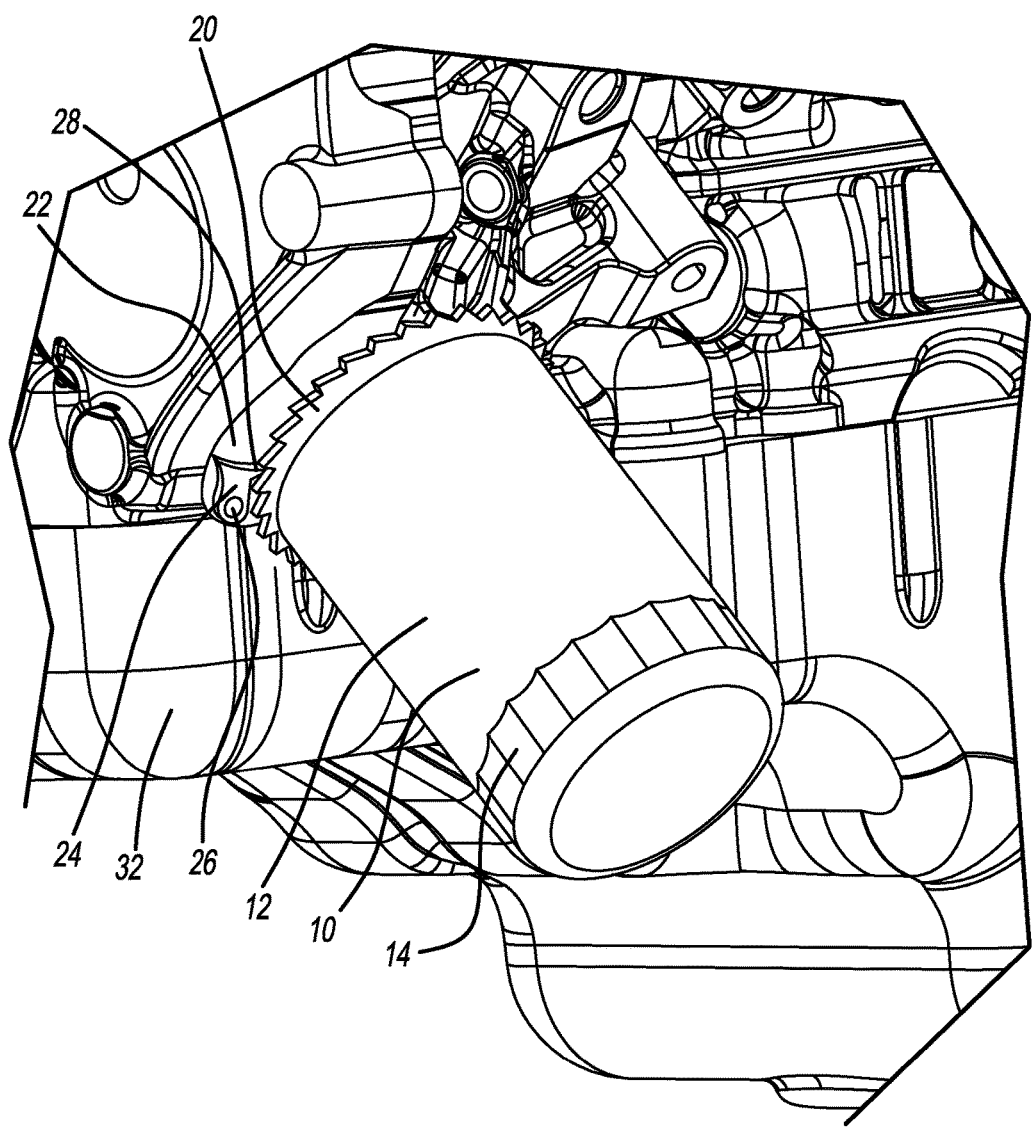
FIG. 5 illustrates an environmental view of the oil filter of FIG. 1 in place on an engine.

The arrangement for releasably attaching the oil filter 10 to the lubrication system illustrated in FIGS. 3, 4 and 5. With reference thereto, an oil filter attachment base 22 formed on the engine is illustrated having the oil filter 10 attached thereto. A ratchet pawl assembly 24 is operatively associated with the oil filter attachment base 22 to retain the oil filter 10 and to prevent the unintentional loosening of the oil filter 10 from the oil filter attachment base 22. The ratchet pawl assembly 24 includes a ratchet pawl pivot 26 to which is pivotably attached a spring-loaded ratchet pawl release tab 28. A ratchet pawl release tab engagement tooth 30 extends from the ratchet pawl release tab 28 for selective engagement with the ratchet ring gear 20. The oil filter attachment base 22 is formed on the engine 32.

In operation, installation of the oil filter 10 onto the oil filter attachment base 22 is carried by out by the installer threading the oil filter 10 onto an externally-threaded oil outlet in fluid communication with the lubrication system of the engine 32 and conventionally provided as part of the oil filter attachment base 22. The operator threads the oil filter 10 onto the externally-threaded oil outlet until the oil filter 10 is properly seated against the oil filter attachment base 22. During installation, the ratchet pawl release tab engagement tooth 30 of the ratchet pawl release tab 28 passes readily over the teeth of the ratchet ring gear 20 in the installation direction of rotation. However, the ratchet pawl release tab engagement tooth 30 engages a tooth of the ratchet ring gear 20 thereby preventing loosening of the oil filter 10 from its seated position.

Selective removal of the oil filter 10 from its seated position against the oil filter attachment base 22 by the repair technician is made possible when the technician moves the ratchet pawl release tab 28 from its engaging position as illustrated in FIGS. 3, 4 and 5 and against the tension applied by the spring (not shown). This movement disengages the ratchet pawl release tab engagement tooth 30 from the ratchet ring gear 20, thereby allowing rotation and removal of the oil filter 10 from the oil filter attachment base 22.

Referring to FIGS. 6 and 7, an alternative arrangement for the disclosed inventive concept is illustrated. According to this embodiment, it would be possible for a standard oil filter to be adapted for use as part of an anti-rotation locking arrangement as envisioned by the disclosed inventive concept.

Referring to FIG. 6, a perspective view of an oil filter 40 is illustrated. The oil filter 40 includes an elongated canister body 42 having a grip area 44 at its one end, again as is known in the art. Like the grip area 14 of the oil filter 10 discussed above, the grip area 44 provides a convenient and practical location by which the oil filter remover/installer may grasp the filter for rotation.

A pawl assembly 46 is fitted to the connection end of the oil filter 40. The pawl assembly 46 includes a pivotable pawl arm 48 that is attached to the canister body 42 by a canister bracket 50. The canister bracket 50 is either attached directly to the canister body 42 of the oil filter 40 or is attached to a strap 52 that may be attached by the consumer to a standard oil filter. In any event, the pivotable pawl arm 48 is pivotably attached to the canister bracket 50 by a pivot pin 42. Extending from one end of the pivotable pawl arm 48 is a ratchet engagement pin 56.

Referring to FIG. 7, a perspective view of an engine 58 is illustrated. The engine 58 has been adapted for use with the oil filter 40 having the pawl assembly 46 by the provision of an oil filter attachment assembly 60. Included in the oil filter attachment assembly 60 is a centrally located screw-thread engagement port 62. An array of oil inlets 63 for oil returning to the lubrication system from the oil filter 40 is concentrically provided around the centrally located screw-thread engagement port 62. A ratchet ring gear 64 is fixed to the engine 48. The ratchet ring gear 64 is also concentrically provided relative to the centrally located screw-thread engagement port 62.

In operation, and in a manner similar to but not the same as the installation of the oil filter 10 discussed above, installation of the oil filter 40 onto the oil filter attachment assembly 60 is carried by out by the installer threading the oil filter 40 onto screw-thread engagement port 62. The operator threads the oil filter 40 onto the externally-threaded oil outlet until the oil filter 10 is properly seated against the screw-thread engagement port 62. During installation, the ratchet engagement pin 56 of the ratchet pawl arm 48 passes readily over the teeth of the ratchet ring gear 64 in the installation direction of rotation. However, the ratchet engagement pin 56 engages a tooth of the ratchet ring gear 64 thereby preventing loosening of the oil filter 40 from its seated position.

Removal of the oil filter 40 from its seated position against the base of the oil filter attachment assembly 60 by the repair technician is accomplished by the technician moves the ratchet pawl arm 48 from its engaging position and against the tension applied by the spring (not shown). This movement disengages the ratchet engagement pin 56 from the ratchet ring gear 64, thereby allowing rotation and removal of the oil filter 40 from the oil filter attachment assembly 60.

The oil filter anti-rotation lock system of the disclosed concept may be adapted for use on any engine with infinite scaling of sizes to accommodate filters of all sizes and types. The system can be used on any type of engine and in any industry where vibration loosening of an oil filter is a concern. The disclosed system may also be used in performance applications. The disclosed system may also be adapted for use in with both production parts as well as in aftermarket products. Such markets may include, without limitation, the automotive industry, the heavy vehicle industry, the marine industry, the ATV industry as well as in racing applications. The anti-rotation lock system of the disclosed invention may readily find application beyond the internal combustion engine and may be used in any machine requiring a canister or a cartridge oil filter. In addition, the anti-rotation lock system disclosed herein may also find use in virtually any machine using a liquid other that a lubricating oil, such as a coolant.

One skilled in the art will readily recognize from the above discussion, and from the accompanying drawings and claims, that various changes, modifications and variations can be made therein without departing from the true spirit and fair scope of the invention as defined by the following claims.

What is claimed is:

1. An oil filter system for use with a lubricating system of an engine, the oil filter system comprising:
   an oil filter attachment base having a first side and a second side, said oil filter attachment base being attached to an engine;
   an oil filter having a lower end, said lower end removably attached to said first side of said oil filter attachment base;
   a ratchet ring gear attached to one of said lower end of said oil filter or said first side of said oil filter attachment base; and
   a ratchet pawl assembly pivotably attached to the other of said lower end of said oil filter or said first side of said oil filter attachment base,
   wherein said ratchet pawl assembly engages said ratchet ring gear.

2. The oil filter system of claim 1, wherein said oil filter includes a base plate attached to said lower end of said oil filter, said base plate having a plane, said ratchet ring gear having a plane, said plane of said ratchet ring gear being coplanar with said plane of said base plate.

3. The oil filter system of claim 1, wherein said oil filter includes a canister body, said canister body having an outer side and wherein said ratchet ring gear has ratcheting teeth formed thereon, said ratcheting teeth extending away from said outer side of said canister body.

4. The oil filter system of claim 3, wherein said canister body has a periphery, said ratchet ring gear being fitted on said periphery of said canister body.

5. The oil filter system of claim 3, wherein said ratchet ring gear is integrally formed with said canister body as a single, deep-drawn stamping.

6. The oil filter system of claim 1, wherein said oil filter has a canister body and wherein said ratchet ring gear comprises ratcheting teeth, said ratcheting teeth extending away from said canister body.

7. The oil filter system of claim 1, wherein said ratchet pawl assembly is pivotably attached to said first side of said oil filter attachment base.

8. The oil filter system of claim 1, wherein said oil filter includes a canister body and said ratchet pawl assembly is pivotably attached to said canister body.

9. The oil filter system of claim 8, wherein said oil filter further includes a ratchet pawl strap, said strap being attached to said canister body.

10. The oil filter system of claim 9, wherein said ratchet pawl assembly is pivotably attached to said canister body.

11. An oil filter system for filtering a lubricating oil, the oil filter system comprising:
    an oil filter attachment base plate having a first side, a second side, a ratchet pawl assembly mounted on said first side, and a plane;
    an oil filter having a lower end, said lower end mounted onto said first side of said oil filter attachment base plate; and
    a ratchet gear having a plane, said ratchet gear being attached to said lower end of said oil filter, said plane of said ratchet gear being coplanar with said plane of said oil filter attachment base plate,
    wherein when said ratchet pawl assembly engages said ratchet gear, said ratchet gear is permitted to rotate in only one direction with respect to said oil filter attachment base plate.

12. The oil filter system of claim 11, wherein said oil filter has an outer side and wherein said ratchet gear has ratcheting teeth formed thereon, said teeth extending away from said outer side of said oil filter.

13. The oil filter system of claim 12, wherein said oil filter has a periphery and said ratchet gear is a ring gear, said ring gear being fitted on said periphery of said oil filter.

14. The oil filter system of claim 12, wherein said ring gear is integrally formed with said oil filter as a single, deep-drawn stamping.

15. An oil filter system for filtering a lubricating oil, the oil filter system comprising:
    an oil filter having a lower end and an outer side;
    an oil filter attachment base plate;
    a ratchet pawl assembly pivotably attached to said oil filter attachment base plate, said ratchet pawl assembly including a release tab and an engagement tooth extending therefrom; and
    a ratchet gear attached to said lower end of said oil filter, said ratchet gear having ratcheting teeth, said teeth extending away from said outer side of said oil filter,
    wherein said engagement tooth extends radially toward said ratcheting teeth and engages said ratcheting teeth, thereby allowing rotation of said ratchet gear in only one direction with respect to said oil filter attachment base plate.

16. The oil filter system of claim 15, said ratchet gear having a plane and said oil filter attachment base plate having a plane, said plane of said ratchet gear being coplanar with said plane of said oil filter attachment base plate.

17. The oil filter system of claim 16, wherein said oil filter has a periphery and said ratchet gear is a ring gear, said ring gear being fitted on said periphery of said oil filter.

18. The oil filter system of claim 17, wherein said ring gear is integrally formed with said oil filter as a single, deep-drawn stamping.

\* \* \* \* \*